Jan. 19, 1971     A. C. MENIUS, JR., ET AL     3,555,880

LIQUID DENSITY MEASURING SYSTEM

Filed April 12, 1967

INVENTORS
Arthur C. Menius, Jr. &
H. Thomas Bentley III

BY Allan M. Lowe

ATTORNEY 3,555,880
LIQUID DENSITY MEASURING SYSTEM
Arthur C. Menius, Jr., Raleigh, N.C., and Harry Thomas
Bentley III, Tullahoma, Tenn., assignors to Industrial
Nucleonics Corporation, a corporation of Ohio
Filed Apr. 12, 1967, Ser. No. 630,415
Int. Cl. G01n 9/00
U.S. Cl. 73—32                                   13 Claims

ABSTRACT OF THE DISCLOSURE

Disclosed is a system for measuring the density of a liquid in response to changes in the resonant frequency of a piezoelectric crystal. First and second piezoelectric crystals are positioned in proximity to each other and approximately at the same depth below the liquid surface. One of the crystals is loaded by the liquid being monitored while the second crystal is positioned in a body of reference fluid that is coupled with the liquid being monitored so that the difference in resonant frequencies of the crystals is indicative only of the density of the monitored liquid. The difference in the resonant frequencies of the two crystals is derived by driving the crystals with oscillators, the outputs of which feed a mixer that drives a frequency meter.

---

Figure 1:
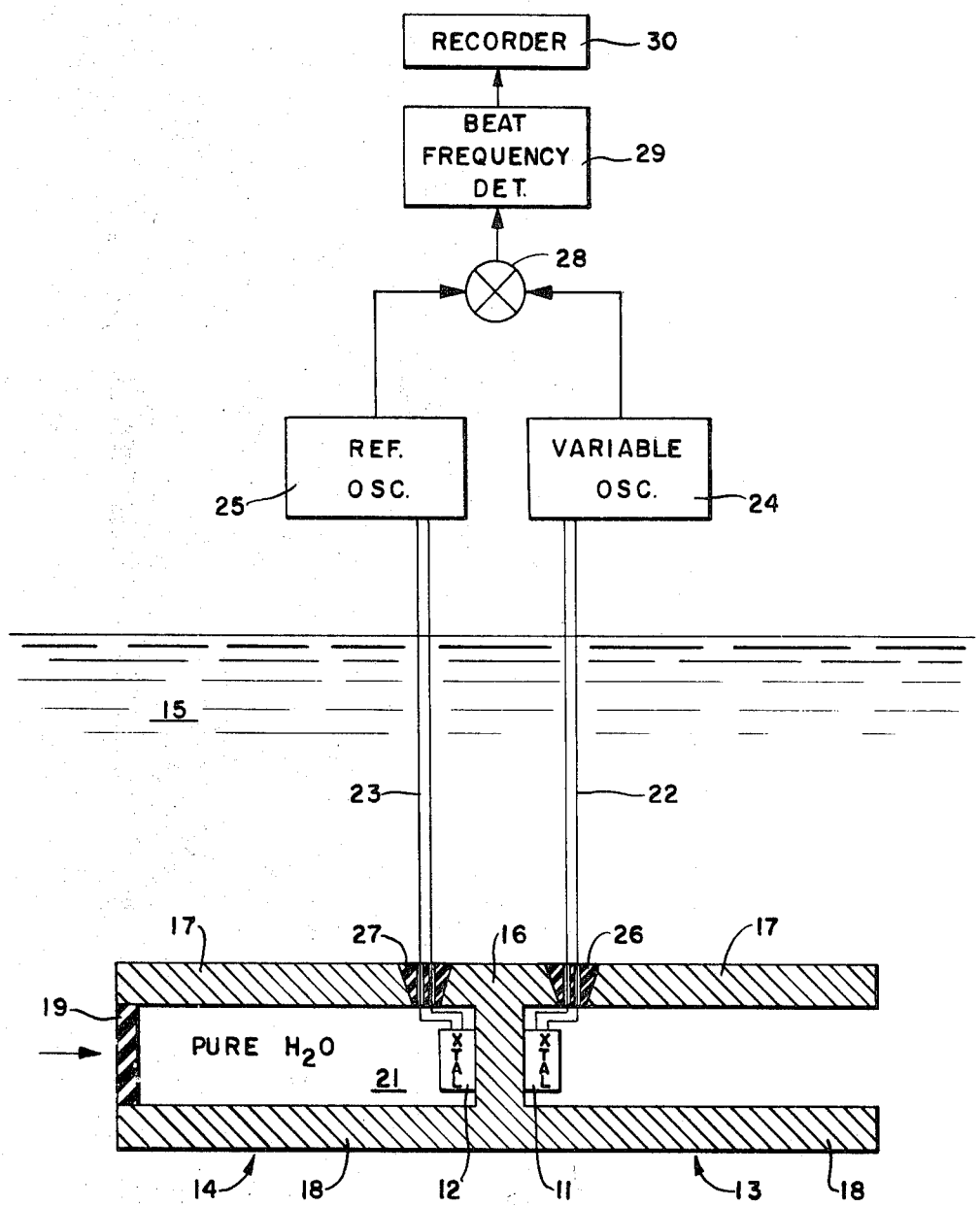

The present invention relates generally to systems for measuring the density of a liquid and more particularly to a system wherein the resonant frequency of a crystal is changed in response to density variations of the liquid being monitored.

The frequency of a solid immersed in a liquid is dependent upon the forces exerted by the liquid on the solid. For example, the frequency of the fundamental mode of vibration of a circular plate semi-infinitely loaded in a liquid is given by:

$$f = \frac{0.474 \frac{hC_p}{a^2}}{1 + \frac{0.1068 F}{\rho_p H a g}} \qquad (1)$$

where:

$f$ is the resonant frequency of the fundamental vibration mode of the circular plate;
$h$ is the plate thickness;
$a$ is the plate diameter;
$\rho_p$ is the plate density;
$C_p$ is a constant determined by the stiffness of the material constituting the plate;
$F$ is the force exerted against the plate by the liquid;
$H$ is the depth of the plate below the liquid surface; and
$g$ is the gravitational acceleration in the area where the plate is located.

Since the force exerted on the plate is a function of the density of the liquid in which the plate is located, the depth of the plate below the liquid surface, the gravitational acceleration in the area where the plate is located, and the area of the plate, $F = \rho H g A$ (where $A = 2\pi a^2$), Equation 1 can be rewritten as:

$$f = \frac{0.474 \frac{hC_p}{a^2}}{\sqrt{\left(1 + 0.670 \frac{\rho w a}{\rho_p h}\right)}} \qquad (2)$$

From Equation 2, it is seen that the resonant frequency of the fundamental vibration mode of a circular plate semi-infinitely loaded in a liquid is a function of the density of the liquid, $\rho w$. Differentiating frequency with respect to liquid density in Equation 2 and expanding the result in a bi-nominal expansion yields:

$$\frac{\Delta f}{\Delta \rho w} = Bf(1 - b\rho_w + b^2\rho_w^2 + \ldots) \qquad (3)$$

where:

$$B = 0.474 \frac{hC_p}{a^2}$$

$$b = 0.670 \frac{a}{\rho P h}$$

$\Delta f$ is the change in resonant frequency; and
$\Delta \rho_w$ is the change in liquid density.

Since the product $B\rho_w$ is much less than 1, the first and higher order terms in Equation 3 can be considered as 0 and the change in the resonant frequency can be accurately expressed as being directly proportional to the product of resonant frequency prior to the change and the change in the density of the liquid in which the circular semi-infinitely loaded plate is positioned, i.e., $\Delta f = Bf \Delta \rho_w$.

According to the present invention, the changes in resonant frequency of a body loaded by a liquid are utilized for monitoring variations in the density of the liquid in which the body is located. Changes in the resonant frequency of the body are monitored by utilizing a mechanical to electrical transducer, such as a piezoelectric crystal, as the body. Resonant frequency changes in the crystal are monitored by connecting the crystal to be excited by an electronic oscillator, connected so its output frequency is dependent upon the crystal resonant frequency.

According to an important feature of the present invention, variations in the pressure and temperature of the liquid in which the crystal is positioned have no effect on the derived results. As noted from Equation 1, supra, the resonant frequency of a body, such as a crystal, placed in a liquid is dependent upon the force, hence pressure of the liquid loading the body. Since the pressure exerted by a liquid on the crystal is dependent upon the depth of the body in the liquid, some means must be provided for compensating against possible depth variations. Temperature must be compensated because the crystal size, hence resonant frequency, is variable therewith.

In accordance with the present invention, pressure and temperature variations tending to vary the crystal resonant frequency are compensated by utilizing a second crystal that is placed in a reference medium communicating with the liquid being monitored. Hence, a pair of crystals is provided, one responsive to forces from the liquid being monitored and the second located within a reference body. The reference body is coupled with the liquid being monitored, whereby variations in the pressure and temperature of the liquid are reflected as changes in the loading of the second crystal. Variations in the density of the liquid, however, do not affect loading of the second crystal because the reference body merely serves as a means for transmitting pressure variations of the monitored liquid to the second crystal and the density of the reference body is not subject to material changes in response to pressure differences occurring in the monitored liquid.

In accordance with one preferred embodiment of the invention, the system is utilized for measuring the density of sea water and the reference body comprises pure water that communicates with the sea water through an elastic membrane.

An important aspect of the present invention is the resolution and accuracy obtainable. Since changes in the resonant frequency of the crystal are related to the product of changes in the sea water density and the unloaded natural frequency of the crystal, as seen from Equation 3, resolution is governed by the natural resonant frequency of the loaded crystal. Hence, resolutions on the order of one part in one million can be achieved merely by employing a piezoelectric crystal having a natural resonant frequency, when driven in air, of one megahertz.

It is, accordingly, an object of the present invention to provide a new improved system for measuring the density of a liquid.

Still another object of the present invention is to provide a system for measuring the density of a liquid by measuring the resonant frequency of a crystal.

Yet another object of the present invention is to provide a new and improved system for measuring liquid density, wherein variations in the pressure and temperature of the monitored liquid have substantially no effect on the derived indication.

Figure 2:
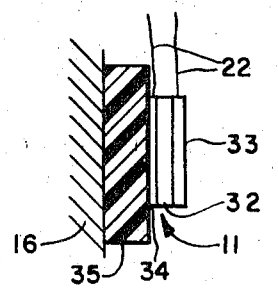

The above and still further objects, features and advantages of the present invention will become apparent upon consideration of the following detailed description of one specific embodiment thereof, especially when taken in conjunction with the accompanying drawings, wherein:

FIG. 1 is a schematic block diagram of one preferred embodiment of the invention: and FIG. 2 is an enlarged detailed view illustrating the manner in which one of the crystals in FIG. 1 is mounted and has electrodes secured thereto.

Reference is now made to FIG. 1 of the drawings, wherein matched piezoelectric crystals 11 and 12, which may be barium titanate, or quartz, are positioned within chambers 13 and 14, that are at substantially the same depth below the surface of sea water body 15. Each of chambers 13 and 14 has substantially the same shape, having a common center wall 16 from which extend a pair of parallel, elongated rectangular, metal plates 17 and 18. Plates 17 and 18 are connected to each other throughout their length by further metal plates, not shown.

The end of chamber 13 between plates 17 and 18 is open, whereby a column of sea water loads at least one of the faces of piezoelectric crystal 11. In contrast, chamber 14 is closed at the ends of plates 17 and 18 by a rubber membrane or diaphragm 19. Positioned within the confines of elastic chamber 14, as defined by the inner surface of membrane 19, the upper and lower walls of plates 17 and 18, and the left side of divider 16, is sealed body 21 of pure water. Water body 21 completely fills the interior of chamber 14 and is coupled to sea water body 15 only through membrane 19, whereby variations in the pressure of the sea water, is caused by changes in the depth of chambers 13 and 14, are coupled through pure water body 21 to one of the faces of piezoelectric crystal 12. Variations in the temperature of sea water body 15 are coupled through the metal plates and pure water body 21 to crystal 12. Hence, crystals 11 and 12 are at the same temperature and are loaded to the same extent by the local pressure of sea water body 15.

The water loads imposed upon the exposed faces of crystals 11 and 12 change the thicknesses of the crystals, whereby their equal unloaded resonant frequencies are altered for differing water loads. The thickness, hence resonant frequency, of piezoelectric crystal 11 changes in response to variations in the pressure, temperature and density of sea water body 15, as coupled into chamber 13. The resonant frequency of crystal 12, however, is governed only by the pressure and temperature of sea water body 15, and not by the density thereof. Variations in the density of sea water body 15 are not coupled through the pure water body 21 to load piezoelectric crystal 12. Instead, the constant density of pure water body 21 loads one of the faces of crystal 12. Pure water body 21 merely serves as a medium for coupling pressure and temperature variations of sea water body 15 on membrane 19 to one of the faces of crystal 12. Water is utilized for body 15, rather than some other coupling medium, because pure water loads the crystal approximately the same as sea water, whereby the resonant frequencies of matched crystals 11 and 12 are never greatly displaced. It is desirable to maintain the resonant frequencies of crystals 11 and 12 close to each other because resonant frequency variations are non-linear over a wide range of loading.

To measure the difference in resonant frequencies of crystals 11 and 12, the crystals are connected via leads 22 and 23 to the frequency determining circuits of variable and reference oscillators 24 and 25, respectively. Leads 22 and 23 are coupled to oscillators 24 and 25 through seals 26 and 27, respectively, in each of chambers 13 and 14. Seals 26 and 27 are mounted in apertures extending through the width of elongated plate 17 to prevent sea water body 15 being coupled to crystals 11 and 12 in proximity to center wall 16.

Oscillators 24 and 25 drive crystals 11 and 12 to their resonant frequencies, as determined by the water loads imposed on the crystals. The output frequencies of the oscillators vary linearly with changes in the thickness of crystals 11 and 12, whereby the frequencies derived from oscillators 24 and 25 are equal to the resonant frequencies of crystals 11 and 12. Since the difference in the resonant frequencies of matched crystals 11 and 12 is determined solely by the density difference between sea water body 15 and pure water body 21, the output frequencies of oscillators 24 and 25 differ solely by the density difference.

To measure the difference in frequency between oscillators 24 and 25, the outputs thereof are heterodyned in mixer 28, which derives a difference, beat frequency indicative of the resonant frequency separation of matched crystals 11 and 12. The difference frequency output of mixer 28 is aplied to beat frequency detector 29 that drives a suitable recorder, for example a strip or chart recorder 30, with a D.C. signal amplitude proportional to the detector input frequency. The signal derived from recorder 30 is proportional of the density of sea water body 15 at the depth to which chambers 13 and 14 are submerged. Any variations in the dimensions of crystals 11 and 12 caused by differences in the pressure of sea water body 15 and by temperature variations thereof have substantially no effect on the beat frequency applied to detector 29 and the recorded indication. Hence, the D.C. signal coupled by detector 29 to recorder 30 and the recorder display are proportional solely to the density of sea water body 15.

In designing the system of the present invention, it is desirable for crystals 11 and 12 to have an unloaded, i.e. loaded by air only, natural frequency as high as possible, while being able to withstand the forces exerted thereon without fracture. To this end, the natural frequencies of crystals 11 and 12 are on the order of 1 megahertz, whereby resolution of one part in one million in the sea water density variable being monitored is derived.

Reference is now made to FIG. 2 of the drawings wherein there is illustrated, in detailed form, the construction and mounting of piezoelectric crystal 11 on divider wall 16. Piezoelectric crystal 11, in one preferred embodiment, comprises a disc of barium titanate having a thickness on the order of 1 millimeter, to provide an unloaded resonant frequency of approximately 1 megahertz. Silver electrodes 33 and 34 are deposited on opposite faces of barium titanate body 32, utilizing conventional deposition techniques. The surface of electrode 34 remote from crystal body 32 is bonded to one edge of dielectric plate 35, the other edge of which is secured to the face of wall 16. Leads 22 are connected to electrodes 33 and 34 for connection to the frequency determining circuit of oscillator 24.

By mounting piezoelectric crystal 11 in the manner specified, barium titanate body 32 functions as a semi-infinitely loaded circular plate that is excited by oscillations derived from oscillator 24. Oscillator 24 couples energy back to crystal 11, whereby the crystal is considered as a self-excited plate and the frequency of its fundamental vibration mode is given by Equation 2, supra. By mounting crystal body 32 so that its smallest dimension, thickness, is loaded by the column of water in chamber 13, maximum resonant frequency changes of the crystal are derived in response to pressure and density changes of sea water body 15.

Crystal 12 is mounted on the opposite side of divider wall 16 in the same manner illustrated for crystal 11.

While we have described and illustrated one specific embodiment of our invention, it will be clear that variations of the details of construction which are specifically illustrated and described may be made without departing from the true spirit and scope of the invention as defined in the appended claims.

We claim:

1. A system for measuring the density of a liquid subject to local variations of temperature and/or pressure comprising a piezoelectric crystal having a predetermined resonant frequency, said crystal being positioned in said liquid so that one face thereof is loaded by said liquid and the resonant frequency thereof is controlled by the variations in density and said local variations, and means for measuring changes induced in the resonant frequency of said crystal only in response to variations in the density of the liquid loading said one face and independently of said local variations.

2. The system of claim 1 wherein said crystal has its thickness loaded by said liquid, said thickness being dimensioned so that the resonant frequency of said crystal is on the order of 1 megahertz.

3. The system of claim 2 wherein said crystal is a disc semi-infinitely loaded by said liquid.

4. The system of claim 1 wherein said means for measuring includes an oscillator driving said crystal and connected with said crystal so its output frequency is dependent upon the resonant frequency of said crystal.

5. A system for measuring the density of a liquid subject to local variations of temperature and/or pressure comprising first and second piezoelectric crystals having predetermined resonant frequencies, means positioning said crystals in proximity to each other in said liquid at substantially the same depth below the liquid level, said first crystal being positioned in said liquid so that one face thereof is loaded by said liquid, a body of reference fluid loading one face of said second crystal, means coupling said body of reference fluid with said liquid so that pressure variations of the liquid are coupled by said fluid to said second crystal, and means for measuring the relative changes induced in the resonant frequencies of said first and second crystals in response to variations of loading on said faces thereof, said relative changes being induced only in response to variations of the liquid density and being independent of said local variations.

6. The system of claim 5 wherein said means for measuring comprises first and second oscillators respectively coupled to drive said first and second crystals so that the frequencies derived by said oscillators are dependent upon the resonant frequencies of said crystals, and means for measuring the frequency difference derived from said oscillators.

7. The system of claim 6 wherein said crystals are matched to have substantially the same resonant frequencies when loaded by air.

8. The system of claim 7 wherein said first and second crystals have their thicknesses loaded by said liquid and fluid, respectively, said liquid and fluid having approximately equal densities so that the loaded resonant frequencies of said crystals are not widely separated.

9. The system of claim 8 wherein said crystals are dimensioned so that the resonant frequencies of said crystals are on the order of 1 megahertz.

10. The system of claim 9 wherein said first and second crystals are discs semi-infinitely loaded by said liquid and reference fluid, respectively.

11. The system of claim 7 wherein said fluid is pure water and said liquid is an aqueous mixture subject to variable density.

12. The system of claim 5 wherein said coupling means comprises an elastic membrane, and said fluid is a liquid confined by said membrane.

13. The system of claim 1 wherein said means for measuring includes: means for deriving a first response indicative of the difference in the resonant frequency of said crystal resulting from said local variations relative to the resonant frequency of the crystal due to said local variations and density, and means for combining the first response with a second response indicative of the actual resonant frequency of said crystal to derive the measurement of said induced changes.

References Cited

UNITED STATES PATENTS

| | | | |
|---|---|---|---|
| 1,789,369 | 1/1931 | Meissner | 73—24X |
| 2,869,357 | 1/1959 | Kritz | 73—32 |
| 2,896,449 | 7/1959 | Turner | 73—181 |
| 2,990,543 | 6/1961 | Rod | / 340—244 |

JAMES J. GILL, Primary Examiner

J. K. LUNSFORD, Assistant Examiner